United States Patent [19]

Ojima

[11] Patent Number: 5,037,357

[45] Date of Patent: Aug. 6, 1991

[54] BELT OR CHAIN TENSIONER FOR POWER TRANSMITTING SYSTEM

[75] Inventor: Juji Ojima, Aikawa, Japan

[73] Assignee: NHK Spring Co., Ltd., Yokohama, Japan

[21] Appl. No.: 545,504

[22] Filed: Jun. 29, 1990

[30] Foreign Application Priority Data

Jul. 7, 1989 [JP] Japan .................................. 1-176418

[51] Int. Cl.⁵ ............................................ F16H 7/08
[52] U.S. Cl. ..................................... 474/111; 474/138
[58] Field of Search ........................ 474/101, 109–111, 474/113–117, 133, 135, 136, 138

[56] References Cited

U.S. PATENT DOCUMENTS

| | | | |
|---|---|---|---|
| 4,702,726 | 10/1987 | Ojima et al. | 474/138 X |
| 4,722,720 | 2/1988 | Ojima et al. | 474/138 X |
| 4,863,417 | 9/1989 | Kimata et al. | 474/138 X |

FOREIGN PATENT DOCUMENTS 0849270 9/1960 United Kingdom ................ 474/138

Primary Examiner—Thuy M. Bui
Attorney, Agent, or Firm—Fleit, Jacobson, Cohn, Price, Holman & Stern

[57] ABSTRACT

A simplified, low cost and nonresonant belt or chain tensioner comprising a casing made of sheet metal, a compression spring and a subordinative compression spring of nonlinear characteristic.

5 Claims, 4 Drawing Sheets

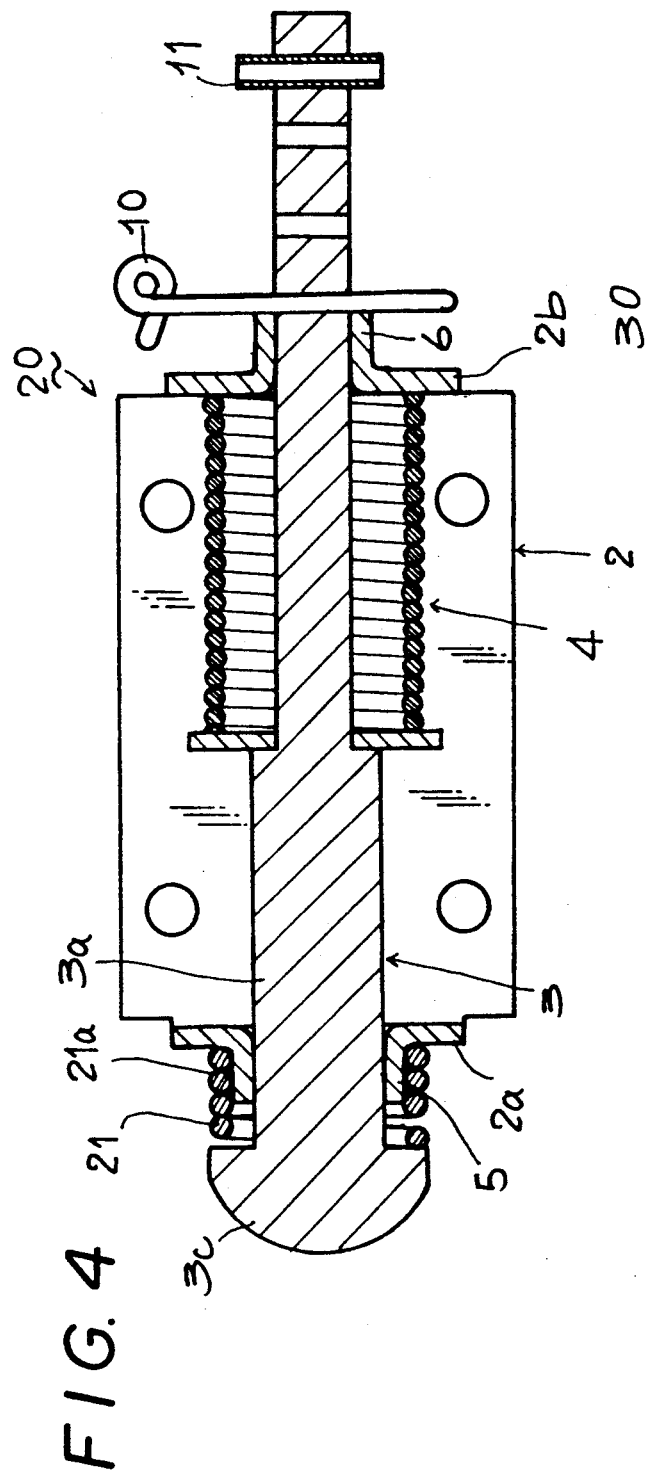
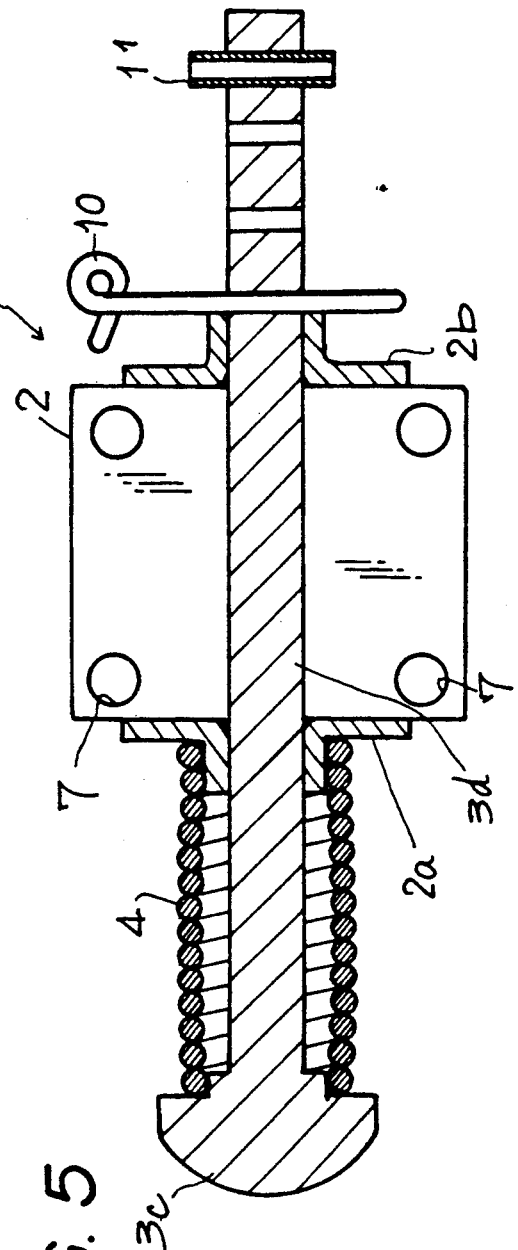
FIG. 4
FIG. 5

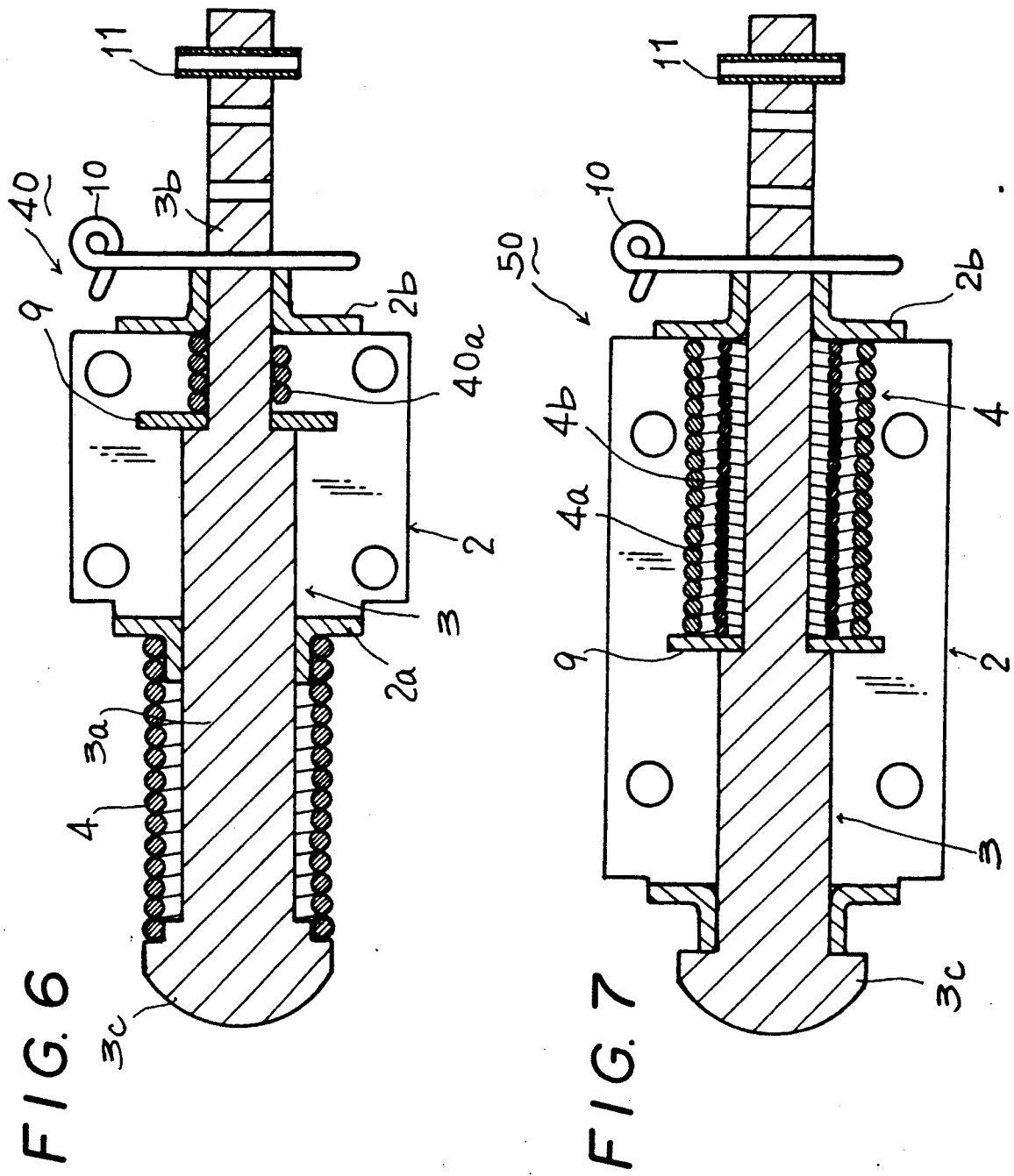

BELT OR CHAIN TENSIONER FOR POWER TRANSMITTING SYSTEM

BACKGROUND OF THE INVENTION

The present invention relates to a tensioner for tensioning a belt or chain of an automobile, more particularly to a simplified tensioner for replacement.

Conventionally, tensioners have been used for tensioning the timing chain or belt, wherein a tension rod is slidably supported in a die cast casing so as to be urged by a spring mounted coaxially in the casing. Then the belt or chain can be kept at an adequate tension by the urging tension rod.

In these cases, the tensioners have to be protected from dust and foreign objects so as to function exactly, therefore die cast casings were indispensable for conventional tensioners. Consequently, conventional tensioners are so heavy and expensive that they are not available for chain and belt for replacement.

The present invention was developed considering above situation and is to provide light and low cost tensioners.

SUMMARY OF THE INVENTION

In order to carry out the above purpose, a tensioner according to the present invention comprises a metal sheet casing bent in bracket form with front and rear bearings formed on opposed bent ends, a tension rod with a spring seat slidably inserted in the bearings, a compression spring mounted between the rear bearing and a bearing seat for urging tension rod and a stopper means for controlling the stroke of the tension rod.

BRIEF DESCRIPTION OF THE DRAWINGS

FIG. 1 (b) shows a section taken along line Y-Y of FIG. 1.

FIG. 4 to 7 show various sectional views according to the embodiment No. 2 to 5.

EMBODIMENT

Hereinafter respective embodiments will be explained with reference to the drawings.

Figure 1B:
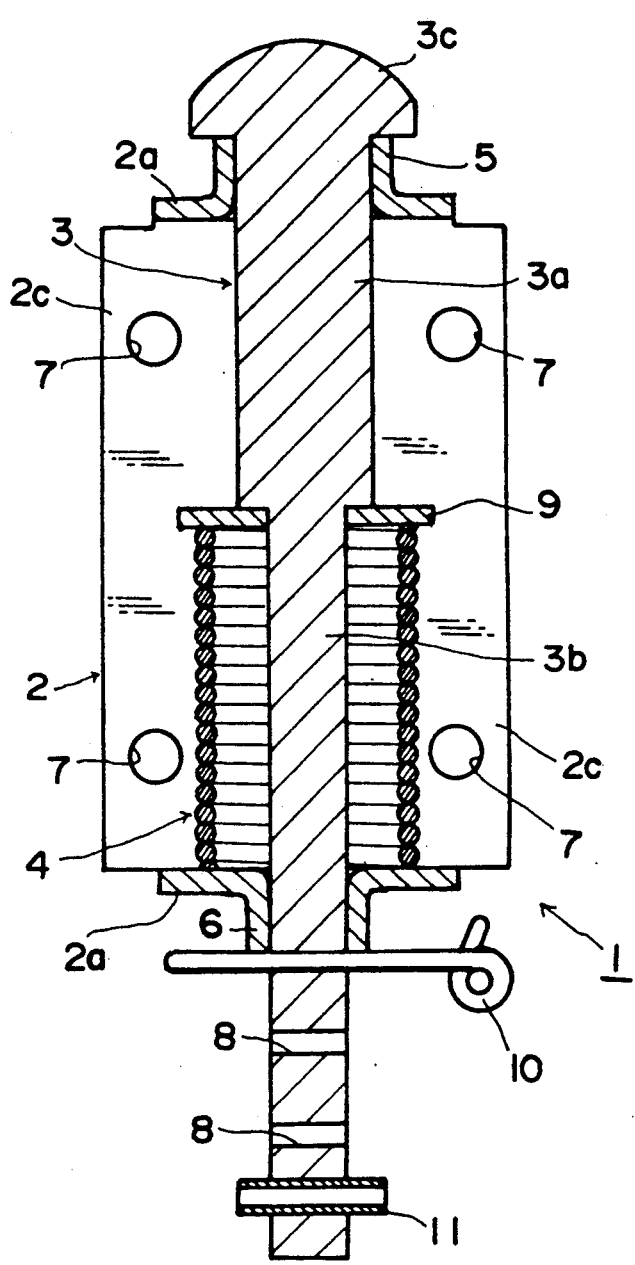
FIG. 1 (a) shows a lateral view of an embodiment according to the present invention.
Figure 1A:
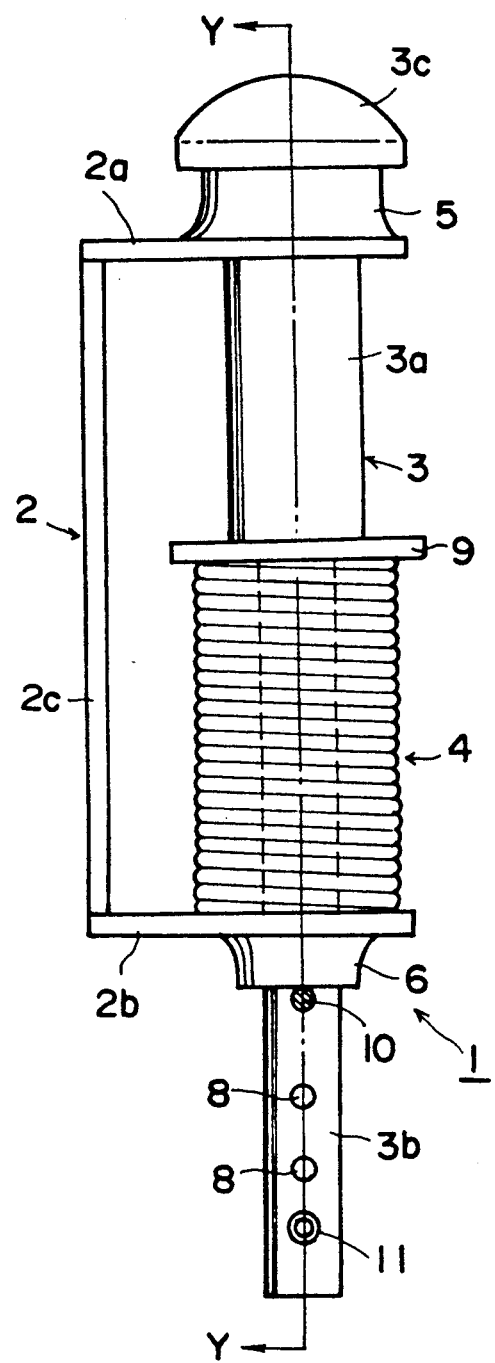
Figure 2A:
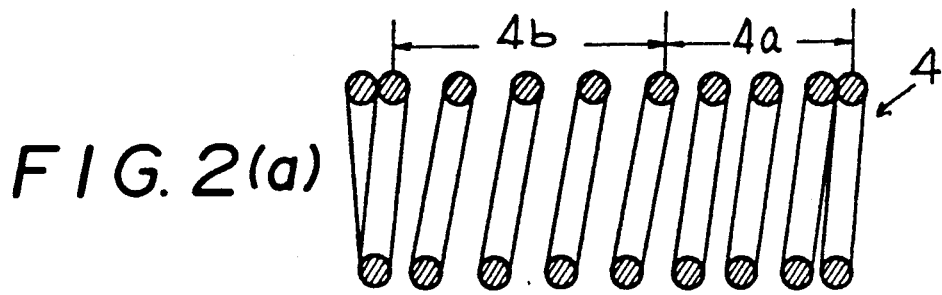
FIG. 2 shows various states of compression spring with nonlinear characteristic used in the above tensioner, wherein (a) shows a sectional view of a spring in free state, (b) shows a sectional view of a spring when mounted in the tensioner, and (c) and (d) show sectional views of a spring in various states of operation.
Figure 2B:
Figure 2C:
Figure 2D:
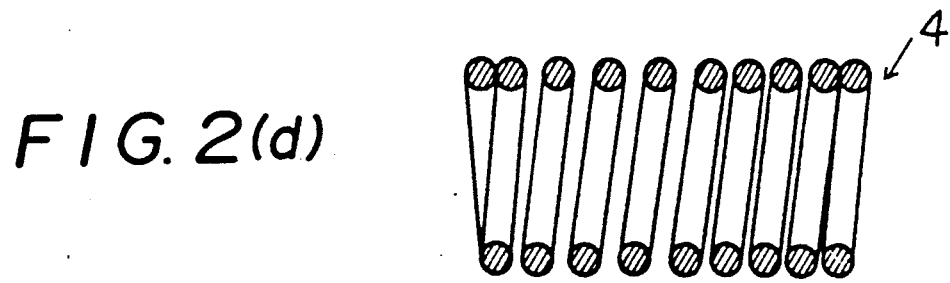

Referring to FIGS. 1 (a) and (b), a tensioner 1 mainly comprises a casing 2, a tension rod 3 slidably inserted in the casing 2 and a compression spring 4 mounted between the tension rod and the casing 2. The casing is made of sheet metal bent in bracket form so as to form front and rear bearings 5 and 6 on opposed ends and holes 7 for fixing on the bottom 2c. The front bearing 5 is larger than the rear bearing 6.

A tension rod 3 has two different diameter portions, a large diameter portion 3a and a small diameter portion 3b, wherein a step is formed by the difference of diameter. A round head 3c is formed on the front end of tensioning rod for tensing on a belt or chain. A plurality of through holes 8 are formed on the tail portion of the small diameter portion 3b of the tension rod perpendicularly at adequate distances. The large diameter portion 3a of the tension rod 3 is supported by the front bearing 5 and the small diameter portion 3b is supported by the rear bearing 6 so as to be slidable to the front and back on the casing 2. A spring seat or bearing seat 9 is mounted on the step formed by the small diameter portion 3b and the large diameter portion 3a of tension rod 3. A compression spring 4 is mounted between the spring seat 9 and the rear bearing 6 so as to drive the tension rod 3 always to the front.

In this case, a compression spring of nonlinear characteristic made of stranded wire material is used.

In this manner, the tension rod 3 is urged by the compression spring 4 when in use, but held by a stopper pin 10 inserted in a through hole 8 of the small diameter portion 3b of tension rod 3 when not in use as for well as storage and transport.

Numeral 11 indicates a spring pin pressed in a through hole formed perpendicularly on the tail end of tension rod. The maximum stroke of tension rod 3 is limited by the spring pin 11.

Various compression springs are illustrated in the FIG. 2 (a) to (d), of which spring 4 indicated with (a) is used in the tensioner in the FIG. 1 (a) and (b). The compression spring 4 comprises two different pitch portions, one half in large pitch and the other half in small pitch.

This type of compression spring 4 is mounted externally on the tension rod 3 between the spring seat 9 and the rear bearing 6 and its free length is limited by the stopper pin 10.

The tensioner 1 assembled in this way is fixed on determined equipment and the tension rod is unlocked by taking off the stopper pin 10. The head of the tension rod is abutted on a tension pulley (not shown) so as to be set in position, wherein the compression spring 4 is in state shown in the FIG. 2(C), that is, the small pitch portion 4a is closed and the large pitch portion 4b is separated yet. The small pitch portion 4a extends when more tension is needed so as to follow even a little slacking of belt. The tension rod 3 urged by the compression spring wound in different two pitches does not turn rigid even when an excessive counterforce is received from the belt and retreats backward still having a elasticity of compression spring 4, preventing an excessive tension on the belt. When resonance occurs on the belt, the number of effective windings of the compression spring varies according to the turning point of a characteristic curve of the spring resulting in variation of proper natural frequency and alleviating the resonance aforementioned.

Figure 3A:
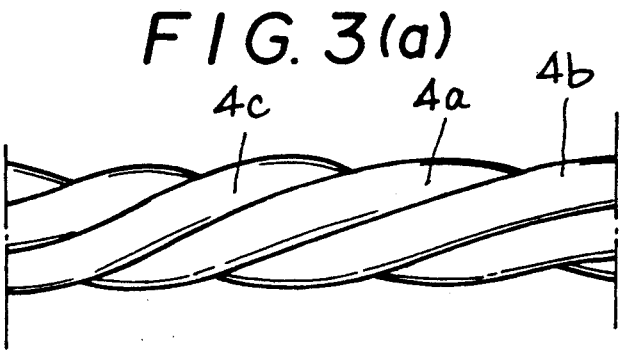
FIG. 3 shows a wire material for fabricating a stranded wire spring for the above tensioner, wherein (a) shows a partial lateral view of stranded wire and (b) shows a sectional view of stranded wire.
Figure 3B:
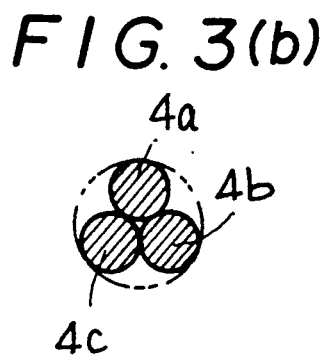

Also a compression spring made of stranded wire may be used as compression spring 4. For example, a stranded wire made of three wires such as 4a, 4b and 4c may be wound to make a compression spring 4 as shown in FIG. 3 (a) and (b). This type of compression spring has a wide range of load-flection curve with hysteresis loss due to friction between wire elements 4a, 4b and 4c. Therefore the tensioner provided with a compression spring of two different pitchs can prevent a excessive tension of the belt and alleviate the resonance of the belt by means of proper hysteresis loss.

The second embodiment according to the present invention is shown in the FIG. 4.

A tensioner 20 is provided with a short subordinative compression spring 21 inserted externally on the neck of tension rod between the head and the flange portion 2a of bearing 5. Other construction is identical with the tensioner 1 aforementioned. An explanation will be omitted on identical elements with those of tensioner 1 by using identical numerals. The subordinative compression spring 21 works as a damper so that the tension rod 3 may not turn rigid object when retreats backward after receiving an excessive counterforce from belt.

FIG. 5 shows the third embodiment according to the present invention. A tensioner 30 comprises a tension rod 3d of single diameter and a compression spring 4 is inserted externally on the tension rod between the head 3c and the flange portion 2a of front bearing. Other construction is identical with that of tensioner 1 aforementioned. An explanation will be omitted on identical elements with those of tensioner 1 by using identical numerals. The tensioner 30 functions as well as the tensioner 1.

FIG. 6 shows the fourth embodiment according to the present invention.

A tensioner 40 comprises a tension rod having a large diameter portion 3a and a small diameter portion 3b. A spring seat 9 is mounted on the step of small diameter portion 3b. A subordinative spring 40a is mounted on the small diameter portion 3b of the tension rod between the spring seat 9 and the flange portion of rear bearing 6. Other construction is identical with that of tensioner 30 aforementioned. An explanation will be omitted on identical elements with those of tensioner 30. The subordinative compression spring 40a functions as a damper when the tension rod retreats backward after receiving an excessive counterforce from belt so as not to turn a rigid object.

FIG. 7 shows a fifth embodiment according to the present invention.

A tensioner 50 comprises a double compression spring having an outer compression spring 4a and an inner compression spring 4b. Other construction is identical with that of tensioner 1 aforementioned. An explanation will be omitted on identical elements with those of tensioner 1. The outer compression spring 4a and inner compression spring 4b are wound in opposite direction so as not to bite each other. At least one of them may be of nonlinear characteristic or made of stranded wire, accordingly the resonance on the belt can be alleviated.

According to all of the embodiments aforementioned, the tensioners 20, 30, 40 and 50 prevent an excessive tension on the belt while still ensuring the retreat of the tension rod 3 when an abnormal counterforce is received from the belt as well as the tensioner 1 and alleviating the resonance on the belt effectively by using a compression spring.

In addition, the compression springs of nonlinear characteristic or compression springs made of stranded wire are used as a driving component so as to alleviate the resonance on the belt. A die cast casing is dispensed with by using a low cost and light casing made of sheet metal. The distance between bearings is widely available so as to obtain stable operation.

What is claimed is:

1. A belt or chain tensioner particularly for use as a spare part for replacement in an automobile, said tensioner comprising:
   a casing made of sheet metal in bracket form having a base and two opposed bent ends, each of said bent ends having a bearing with a flange portion formed thereon;
   a tension rod slidably inserted in said two bearings, said tension rod having a spring seat means provided thereon;
   a tension rod driving means mounted on said tension rod between said spring seat means and the flange portion of one of said bearings; and
   a stopper means inserted in said tension rod for holding the tension rod during storage and transport.

2. A belt or chain tensioner according to claim 1, wherein said tension rod driving means comprises a compression spring of nonlinear characteristic for preventing resonance on a belt or chain.

3. A belt or chain tensioner according to claim 1, wherein said tension rod driving means comprises a compression spring made of stranded wire.

4. A belt or chain tensioner according to claim 1, wherein said tension rod driving means comprises a compression spring with a coaxially mounted subordinative spring for damping.

5. A belt or chain tensioner according to claim 1, wherein said tension rod driving means comprises a double compression spring having an outer compression spring and an inner compression spring, wherein one of said outer compression spring and said inner compression spring is of nonlinear characteristic.

* * * * *